Patented June 18, 1935

2,005,383

UNITED STATES PATENT OFFICE 2,005,383

HYDROLYSIS OF CELLULOSE ESTERS

Thomas F. Murray, Jr., and Cyril J. Staud, Rochester, N. Y., assignors to Eastman Kodak Company, Rochester, N. Y., a corporation of New York No Drawing. Application February 20, 1932, Serial No. 594,387

18 Claims. (Cl. 260—102)

This invention relates to the hydrolysis of solid cellulose esters in a bath comprising an alcohol and zinc iodide or ferric chloride.

According to the patent literature the hydrolysis of cellulose esters is usually performed in one of the following ways:

(1) Adding a small quantity of water to the completed reaction mass and delaying the precipitation or;

(2) Adding a small quantity of water and then raising the temperature for the time necessary to attain the desired degree of solubility or;

(3) Introducing a small amount of sulfuric acid into the mass at the same time with the water, or;

(4) Adding a small quantity of water and sulfuric acid, the whole being diluted with acetic acid or;

(5) Treating the solid cellulose acetate in an aqueous solution of a mineral acid.

We have found a method of hydrolyzing cellulose esters in which the use of mineral acids of any kind and especially sulfuric acid is entirely unnecessary thereby minimizing the danger of instability from the presence of cellulose sulfoacylates in the final product.

We have found that an organic cellulose ester such as cellulose acetate may be hydrolyzed to any desired acyl content by dissolving the solid ester in a mixture comprising an alcohol and zinc iodide or ferric chloride and maintaining at an elevated temperature for several hours, the time depending on the amount of hydrolysis desired.

An example of our invention illustrative of how it may be applied to the hydrolysis of cellulose acetate is as follows:

250 lbs. of zinc iodid is completely dissolved in about 200 lbs. of 95% ethyl alcohol. About 25 lbs. of a cellulose acetate having an acetyl content of more than 43% is added to and partially or completely dissolves in the zinc iodide-alcohol solution. The mixture is maintained at 50–55° C. over a period of several hours, samples being removed from time to time, washed free of zinc iodid and other soluble materials and dried. The samples may then be analyzed for combined acetyl and their specific optical rotation may be determined in a mixture of 85% chloroform and 15% ethyl alcohol (by volume) providing the samples are soluble in that mixture. It is known that the optical rotation of cellulose acetate becomes less negative as acetyl groups are removed; that is, as the material is hydrolyzed.

Upon carrying out the procedure disclosed in the above example the following results were obtained:

| Time hydrolyzed (hrs.) | Percent Acetyl | Optical rotation in $CHCL_3$—$C_2H_5OH$ |
|---|---|---|
| 0 | About 43.5 | Insol. |
| 15⅓ | 39.9 | −22.0° |
| 24 | 36.7 | −16.0° |
| 39⅓ | 31.4 | Insol. |

A cellulose acetate, insoluble in chloroform-alcohol, was employed as the starting material, however, the process is not limited to any particular cellulose tri-acetate but it may be applied to cellulose acetates (or esters) which have been precipitated from a reaction mass, those which have been produced by fibrous esterification processes or those esters in which the acids have been removed by spray drying.

If desired other alcohols than ethyl, such as methyl, propyl, butyl and amyl may be employed in the hydrolysis process of our invention.

Various other organic esters of cellulose than cellulose acetate such as cellulose propionate, cellulose butyrate, cellulose acetate-propionate, cellulose acetate-butyrate, cellulose acetate-laurate, cellulose acetate-phthalate, etc., may be hydrolyzed by the process we have disclosed. Although the usual purpose for hydrolyzing cellulose acetate is to convert it from the triacetate to the acetone-soluble variety, in the case of the higher esters, both simple and mixed, even when the fully esterified cellulose ester is acetone-soluble, it may be subjected to hydrolysis to produce an ester of properties which may differ in some respects from those of the fully esterified esters.

As pointed out previously ferric chloride may be employed in lieu of zinc iodide with equal effect in our hydrolysis process.

Various other modifications which involve mere questions of judgment as to time, temperature, proportions, equivalents, etc., may be made of our process and such modified processes also come within the scope of our invention.

We claim as our invention:

1. The hydrolysis of an organic ester of cellulose in solid form which comprises treating it with a hydrolyzing bath essentially consisting of an alcohol and an inorganic salt selected from the group consisting of zinc iodide and ferric chloride.

2. The hydrolysis of an organic ester of cellulose in solid form which comprises treating it with a hydrolyzing bath essentially consisting of ethyl alcohol and an inorganic salt selected from the group consisting of zinc iodide and ferric chloride.

3. The hydrolysis of a fatty acid ester of cellulose in solid form which comprises treating it with a hydrolyzing bath essentially consisting of an alcohol and an inorganic salt selected from the group consisting of zinc iodide and ferric chloride.

4. The hydrolysis of a fatty acid ester of cellulose in solid form which comprises treating it with a hydrolyzing bath essentially consisting of ethyl alcohol and an inorganic salt selected from the group consisting of zinc iodide and ferric chloride.

5. The hydrolysis of an organic ester of cellulose in solid form with a bath essentially consisting of an alcohol and zinc iodide.

6. The hydrolysis of a fatty acid ester of cellulose in solid form with a bath essentially consisting of an alcohol and zinc iodide.

7. The hydrolysis of an organic ester of cellulose in solid form with a bath essentially consisting of ethyl alcohol and zinc iodide.

8. The hydrolysis of a fatty acid ester of cellulose in solid form with a bath essentially consisting of ethyl alcohol and zinc iodide.

9. The hydrolysis of an organic ester of cellulose in solid form with a bath essentially consisting of an alcohol and ferric chloride.

10. The hydrolysis of a fatty acid ester of cellulose in solid form with a bath essentially consisting of an alcohol and ferric chloride.

11. The hydrolysis of an organic ester of cellulose in solid form with a bath essentially consisting of ethyl alcohol and ferric chloride.

12. The hydrolysis of a fatty acid ester of cellulose in solid form with a bath essentially consisting of ethyl alcohol and ferric chloride.

13. The hydrolysis of cellulose acetate in solid form with a bath essentially consisting of an alcohol and an inorganic salt selected from the group consisting of zinc iodide and ferric chloride.

14. The hydrolysis of cellulose acetate in solid form with a bath essentially consisting of ethyl alcohol and an inorganic salt selected from the group consisting of zinc iodide and ferric chloride.

15. The hydrolysis of cellulose acetate in solid form with a bath essentially consisting of an alcohol and zinc iodide.

16. The hydrolysis of cellulose acetate in solid form with a bath essentially consisting of ethyl alcohol and zinc iodide.

17. The hydrolysis of cellulose acetate in solid form with a bath essentially consisting of an alcohol and ferric chloride.

18. The hydrolysis of cellulose acetate in solid form with a bath essentially consisting of ethyl alcohol and ferric chloride.

THOMAS F. MURRAY, JR.
CYRIL J. STAUD.